US006988212B1

(12) United States Patent
Hamdi

(10) Patent No.: US 6,988,212 B1
(45) Date of Patent: Jan. 17, 2006

(54) METHOD AND SYSTEM FOR ADAPTIVE POWER CONTROL IN A NETWORKING SYSTEM

(75) Inventor: Rabah Hamdi, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 841 days.

(21) Appl. No.: 09/675,533

(22) Filed: Sep. 29, 2000

(51) Int. Cl.
G06F 1/26 (2006.01)

(52) U.S. Cl. ................... 713/310; 713/321; 455/522

(58) Field of Classification Search ............... 713/300, 713/310, 320, 321; 455/39, 68, 69, 522; 370/329, 332, 335; 375/135, 136, 146, 147
See application file for complete search history.

(56) References Cited

U.S. PATENT DOCUMENTS

| | | | | |
|---|---|---|---|---|
| 4,757,495 A | * | 7/1988 | Decker et al. ............... 370/477 |
| 5,465,398 A | * | 11/1995 | Flammer ..................... 455/69 |
| 5,465,399 A | * | 11/1995 | Oberholtzer et al. .......... 455/69 |
| 5,784,002 A | * | 7/1998 | Roehr ..................... 340/825.5 |
| 5,790,940 A | * | 8/1998 | Laborde et al. ............... 455/69 |
| 5,887,245 A | * | 3/1999 | Lindroth et al. .............. 455/69 |
| 5,963,583 A | * | 10/1999 | Davidovici et al. .......... 375/130 |
| 6,002,122 A | | 12/1999 | Wolf .......................... 250/207 |
| 6,108,561 A | * | 8/2000 | Mallinckrodt ............... 455/522 |
| 6,111,936 A | | 8/2000 | Bremer ........................ 379/28 |
| 6,163,570 A | * | 12/2000 | Olafsson ..................... 375/223 |
| 6,289,217 B1 | * | 9/2001 | Hamalainen et al. ........ 455/425 |
| 6,519,705 B1 | * | 2/2003 | Leung ......................... 713/300 |
| 6,542,488 B2 | * | 4/2003 | Walton et al. ............... 370/335 |

* cited by examiner

Primary Examiner—Thuan Du

(57) ABSTRACT

A method and system for adaptively controlling the power of transmissions between nodes in a networking system in order to reduce the potential for cross-talk interference or noise in other communications services coupled to the same transmission media. The inventive system provides a method for sending transmissions at the minimum power level needed in order to ensure reliable communications between nodes in the network thereby reducing potential interference with other systems using the same transmission media. For example, the inventive system and method can be utilized in home networking systems to reduce cross-talk between the network devices and xDSL or POTS devices coupled to the same telephone wiring.

20 Claims, 5 Drawing Sheets

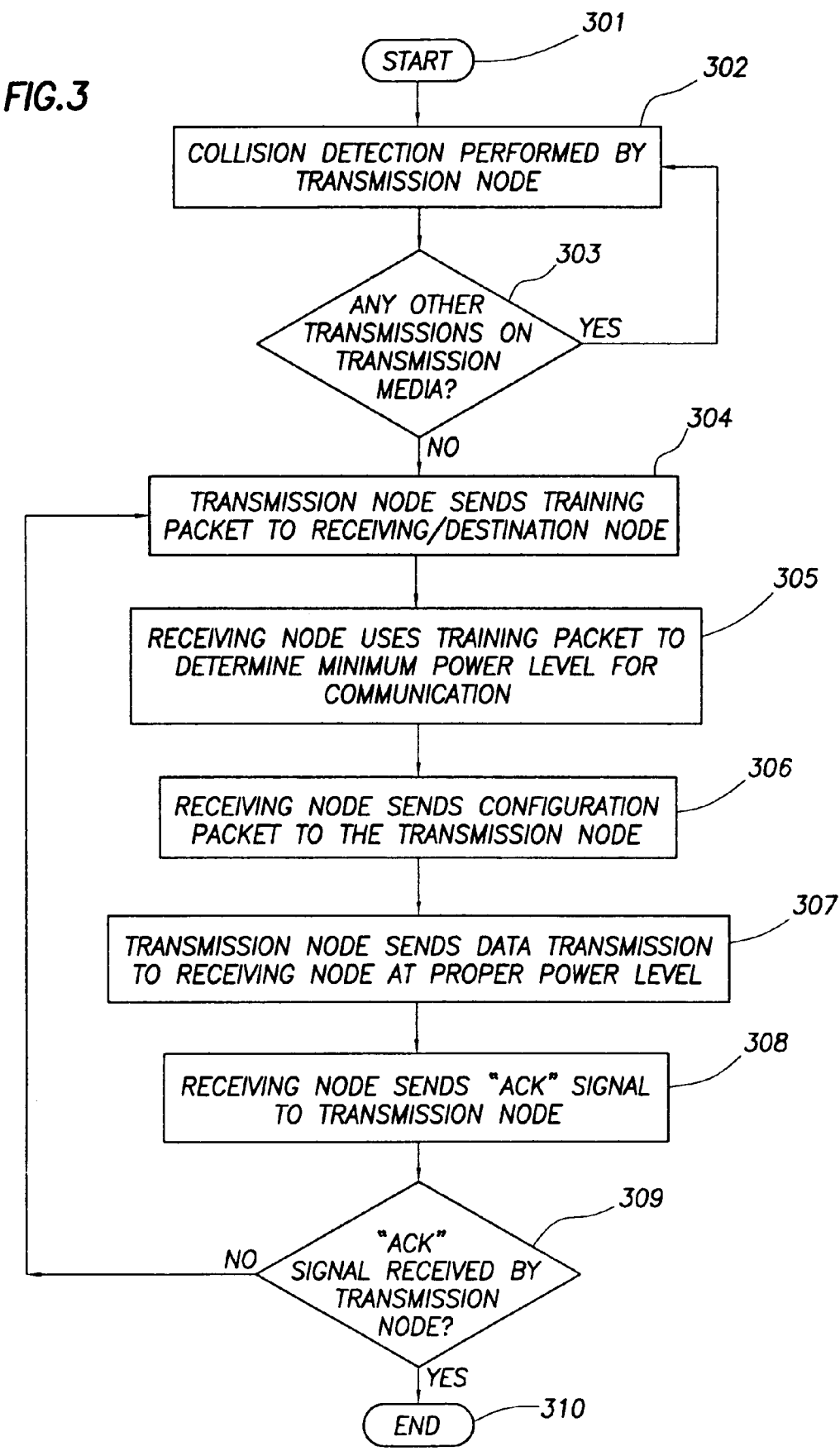

METHOD AND SYSTEM FOR ADAPTIVE POWER CONTROL IN A NETWORKING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a method and system for reducing noise and interference between electronic communication devices that utilize the same transmission media for communications. More particularly, the invention relates to performing adaptive power control ("APC") to optimize the transmit power of each communication device in a networking system in order to reduce interference between the network devices and other communications services coupled to the same transmission media, such as interference between broadband services such as xDSL, voice band telephone service, and home networking systems all sharing the same customer premises telephone wiring.

2. Background of the Invention

In response to the increasing demand for communications services available to the home user, an increasing number of sophisticated and complex communication devices/systems are being coupled to customer premises telephone wiring. These devices include fax machines, telephones, computers, computer networks, xDSL devices, satellite movie ordering systems, etc. Yet, customer premises telephone wiring is relatively unsophisticated, typically comprising a simple twisted wire pair. As the number of communication devices attached to the same wire pair increases, the potential for cross-talk, noise or interference between the devices increases.

As one might expect, deployment of xDSL systems and home networking systems that utilize telephone wiring for communications are facing many challenges. One of the most significant challenges is the increasing potential for interference from one service to another since the services may exist on the same wire pairs in the same home or in the same local loop or telephone binder group. These services may have cross-talk interference from one service onto the other which may not only directly degrade performance of those services but may also impact the performance of the other services on the telephone wiring, for example the underlying POTS (plain old telephone service).

Coexistence of broadband services such as xDSL and home networking systems, along with other services utilizing telephone wiring, is essential to the success of these technologies in the marketplace. To assist in the coexistence of these technologies, the present invention is directed to a method and system to lower the potential interference caused by home networking systems.

BRIEF SUMMARY OF THE INVENTION

In accordance with the present invention, there is provided a novel method and system for reducing the potential for interference between services utilizing customer premises telephone wiring for communications. This is accomplished by utilizing adaptive power control ("APC") to optimize transmit power between devices or nodes on the computer network. Specifically, instead of simply transmitting communications within the network at some predetermined power level which would ensure reliable communication for all applications, that is, setting the power level high enough to handle the worst case scenario, the nodes of the network are equipped with control logic to intelligently determine the proper power level necessary to effectively communicate, which for most circumstances is something less than the worst-case or maximum power level setting. By adaptively transmitting communications between nodes of the network at the minimum required power necessary to ensure reliable communication, the potential for interference with other services on the same transmission media is minimized.

An embodiment of the inventive method of adaptive power control in a computer network having a plurality of nodes coupled to a common transmission media, comprises the steps of: performing collision detection at the transmission node and waiting until there are no communications on the transmission media of the network; sending a training packet from the transmission node of the network to a receiving node in the network at a predetermined power level; determining the preferred power level for reliable communications between the transmission node and the receiving node; sending a configuration packet from said receiving node to said transmission node including the preferred power level for communication; and sending a primary data communication from the transmission node to the receiving node at the preferred power level.

In the inventive method the step of determining the preferred power level for reliable communications between the transmission node and the receiving node may comprise the steps of: determining the average noise level on the transmission media of the network; determining the signal level necessary at the receiving node given the average noise level and required signal-to-noise ratio for reliable communication to the receiving node; determining the amount of attenuation suffered by the training packet between the transmission node and the receiving node; and determining the proper transmit level by summing the signal level necessary at the receiving node and the amount of attenuation.

An embodiment of the inventive system for performing adaptive power control of communications between a transmission node and a receiving node in a network, comprises: a line interface coupled to the transmission media of the network; a receiver operating in a receiving node of the network, comprising: receiver signal monitoring logic coupled to said line interface to monitor the status of the transmission media of the network; receiver signal processing logic coupled to said line interface to receive and extract data from transmissions on the transmission media; receiver control logic coupled to said receiver signal monitoring logic and said receiver signal processing logic, where the receiver control logic determines the preferred power level for transmissions received from a transmission node in the network from the noise level on the transmission media, the attenuation between the receiving node and the transmission node, and the required signal to noise ratio for reliable communication with the receiving node.

Additionally, an embodiment of the system for performing adaptive power control of communications between nodes in a network, may comprise: a line interface coupled to the transmission media of the network; a transmitter operating in a transmission node of the network, comprising: transmitter signal processing logic coupled to said line interface to send transmissions to the transmission media; transmitter control logic coupled to said signal processing logic, where the transmitter control logic directs the transmitter signal processing logic to send a training packet to the receiving node at a predetermined power level, waits for a configuration packet from the receiving node, and then directs the transmitter signal processing logic to send a primary data transmission to the receiving node at a preferred power level.

BRIEF DESCRIPTION OF THE DRAWINGS

The invention can be more fully understood by referencing the accompanying drawings wherein:

FIG. 3 shows a flow chart outlining the steps of an embodiment of the method of adaptive power control in accordance with the present invention;

NOTATION AND NOMENCLATURE

Figure 1:
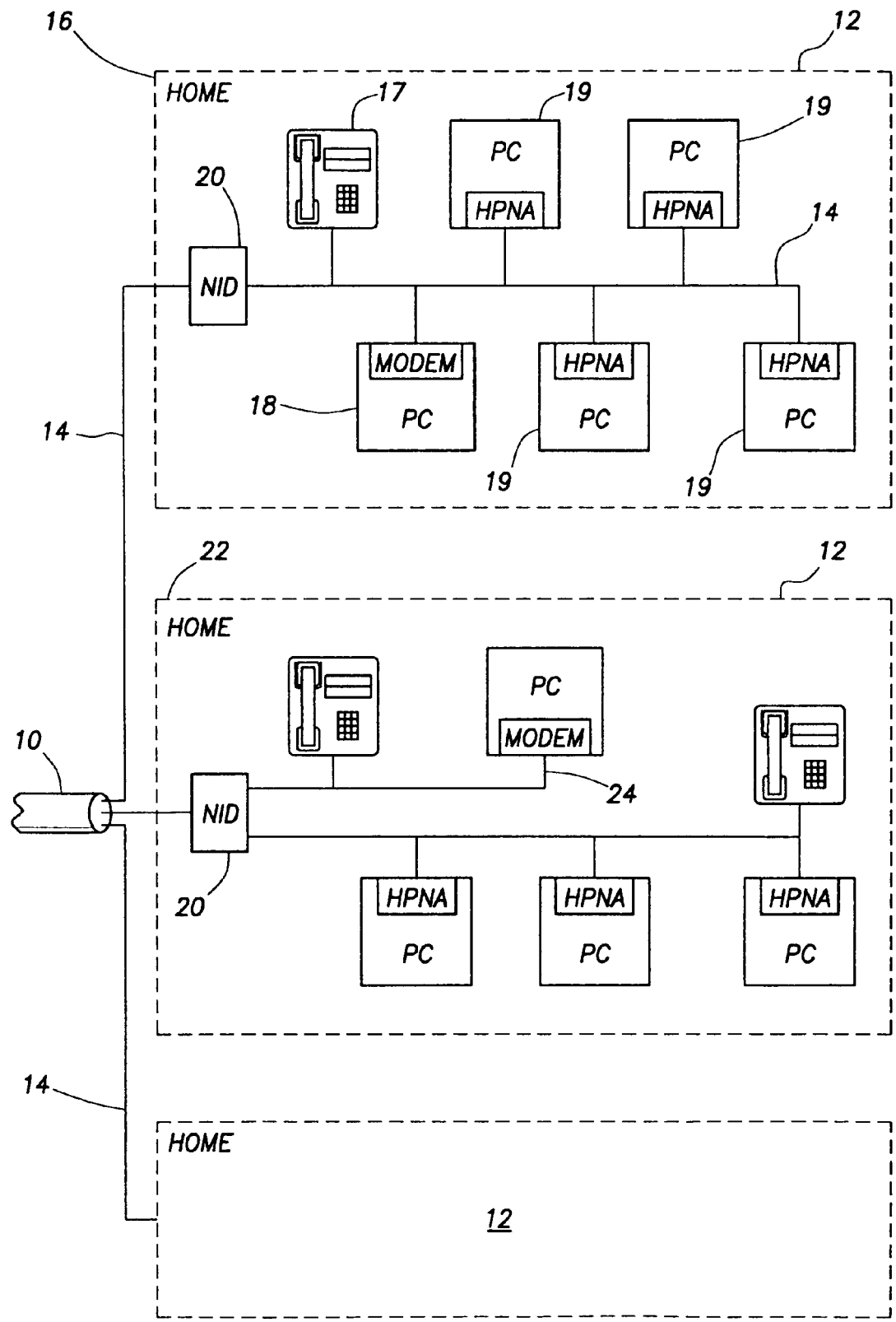
FIG. 1 shows a block diagram of the typical architecture for the communications services for which the present invention is intended.

Certain terms are used throughout the following description and claims to refer to particular system components. As one skilled in the art will appreciate, components may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE DRAWINGS

Referring now to the drawings, wherein like reference characters denote corresponding components or parts:

FIG. 1 shows a block diagram of the typical architecture for the communications services/devices and common transmission media for which the present invention is intended. In particular, a local loop 10 provides standard telephone service to several remote user locations, which could be residential or commercial locations but which will be referred to collectively herein as homes 12. Typically, each home 12 has a twisted wire pair 14 connecting it to the local loop 10, and then the local loop 10 is connected to a central office ("CO") (not shown) for the telephone service in that area. A single local loop 10 may provide connection to multiple homes 12.

In addition to supplying Plain Old Telephone Service ("POTS") to the homes 12, the in-premises telephone wiring 14 may also be used for various other communication services such as any Digital Subscriber Line ("xDSL") services, any home networking systems such as Home Phoneline Networking Alliance ("HPNA") systems or Phoneline Network Devices ("PND") 20 systems, etc. As shown in FIG. 1, although differing communication services and devices are installed in each home 12, the communication devices are coupled to the common telephone wiring 14 in each home 12. Thus, the communication devices share the same transmission media communication channel, i.e., the telephone wiring 14. Obviously, for each home 12 the specific configuration of the communications devices and services may differ.

In a first home 16, the twisted wire pair 14 first enters a Network Interface Device ("NID") 20. The NID 20 provides an interface between the local loop 10 and the communication devices and services installed in the home 16. In the first home 16 shown in FIG. 1, six devices are connected to the NID 20 via the common telephone wiring 14: a standard telephone or POTS device 17, a Personal Computer ("PC") coupled to the telephone wiring via a modem 18 (perhaps for xDSL services), and four PCs networked together over the telephone wiring using HPNA network cards 19. As shown, POTS, xDSL and home network communications would all occur via the same transmission media 14 inside the first home 16, that is, the telephone wiring 14. Since all of the devices are using the same communication channel or wiring infrastructure, there is a serious risk of cross-talk, noise and/or interference between the communications of the various services. By reducing the power levels of the signals sent on the common communication channel, the potential for cross-talk or other interference is reduced.

Control logic on the network interface cards, HPNA cards as shown in FIG. 1, can be used to dynamically control the transmission power levels between nodes in the network so that intra-network communications can be sent at the minimum power levels required to ensure reliable communications while minimizing the potential for interference to other services using the common communication channel. Instead of sending all transmissions at a maximum power level sufficient for worst-case conditions, the control logic allows the power level to be dynamically controlled so the optimum power level is used. The type of transmission media (telephone wiring here), the distance between network nodes, and the topology of the premises wiring all affect the power level required for reliable communications. Having adaptive power control allows the network to adapt or adjust to each unique application or environment.

Another known way to combat the potential interference between the communication devices is to separate the communication channels or transmission media 14 in the home. In a second home 22, also connected to the same local loop 10, the telephone wiring 14 is split by the NID 20 creating separate communication channels or in-premises wiring 24 for the xDSL services/devices from the HPNA networked PCs. Of course, the POTS services could similarly be separated by additional splitting in the NID 20. By implementing isolation circuitry in the NID 20, such as filtering etc., the cross-talk between the services and their now separate communication channels 24 in the home 16 can be reduced. The cost and complexity associated with purchasing, installing and maintaining such separation and isolation circuitry often precludes residential users from utilizing this solution however. And, even with such separation and isolation circuitry, some interference between the communication services may still occur since the services and devices are all still coupled via the NID 20 and local loop 10. In fact, given the connection to the local loop, some communications within a home 12 can leak into the local loop 10 and thereby affect communications in other homes 12. The present invention provides a cost-effective method of reducing interference caused by communications in a home network whether or not isolation and separation circuitry are used.

Figure 2A:
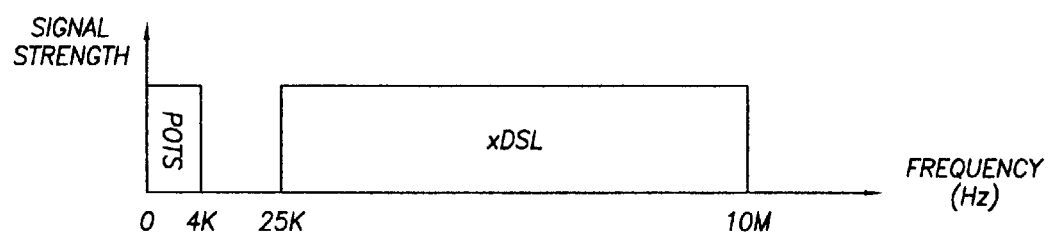
FIG. 2 shows a plot of the typical frequencies at which some of the communication services operate.

FIG. 2 shows a plot of the typical frequencies at which some of the communication 20 services operate. In particular, FIG. 2a shows that POTS signals typically operate in the frequency range of 0 to 4 kHz (kilohertz) while xDSL communications operate in a frequency range of approximately 25 kHz to 10 MHz (megahertz). Thus, there is no overlap in the standard frequency bands for POTS and xDSL communications. Although there is no frequency overlap, there is still the potential for the communications to interfere with one another given the possibility for a modulated and attenuated out of band signal to interfere within the operational frequency range of the services. This noise or interference can be reduced by lowering the power level of the communications or transmissions of the services. Accordingly, the adaptive power control of the present invention can help reduce interference even when the services typically operate in distinct frequency ranges.

Figure 2B:
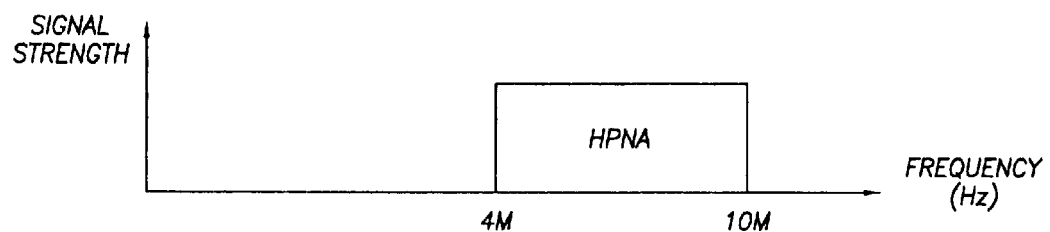

FIG. 2b shows that communications in an HPNA home networking system occur in a frequency range of 4 MHz to 10 MHz. Thus, there is an overlap between the xDSL communications and the HPNA home networking communications. Where there is frequency overlap in the services' communications, it is more likely that the communications may directly interfere with one another reducing performance for both communication systems. Accordingly, the adaptive power control of the present invention is especially helpful to reduce the potential for interference between these services.

It should be noted that the differences in the frequency range in which the communication services operate may allow for another method of reducing interference between the services. In particular, for those services whose communication frequencies do not overlap, such as xDSL and POTS services, a filtering system (low-pass filter and/or high-pass filter) to selectively pass certain frequencies to the devices in each service, could be used to isolate each service's communications from one another. Although using filters to isolate the services is known, and is in fact used in some commercial applications, the addition of filtering components and equipment is rarely used in home applications because of the additional cost, maintenance and operational logistics. Accordingly, the adaptive power control of the present invention can be used to reduce interference where isolation via filtering is either not effective due to the overlapping frequency ranges of the communication services, where isolation proves to be inadequate to reduce interference, or where isolation is not economically or physically feasible such as in a home application.

FIG. 3 shows a flow chart outlining the steps of an embodiment of the method of adaptive power control in accordance with the present invention. In particular, FIG. 3 illustrates the method of adaptive power control undertaken by a node in a home network seeking to transmit data (a "transmission node") to another node in the network (a "receiving node" or "destination node"). The method is typically performed by control logic in the network interface circuitry or on the network card. The process starts at block 301 when a node in the network seeks to transmit data to another node in the network. As noted in block 302, when a communication is desired between two devices or nodes in the network, the transmission node first performs collision detection, meaning it checks to see if any other communications are occurring on the transmission media of the network. As indicated in block 303, if communications or transmissions are occurring, the collision detection is repeated and the process returns to block 302. When no other communications or transmissions are occurring, i.e., the line is quiet, the process continues to block 304 and the transmission node sends a training packet to the receiving node. The training packet is sent at a predetermined power level as set in the network protocol, usually a worst-case or full power level. In home networks, full-power for the network devices is typically set at a level sufficient to send transmissions over 300 feet of telephone wire as a worst-case scenario. Because the training packet is much smaller than a typical data transmission communication, the full power transmission of the training packet is less likely to cause any significant interference than would a full power data transmission of greater duration.

When a training packet is sent, all other nodes of the network remain silent (i.e., do not perform any communications) until the transmission is complete since each node performs collision detection before starting a transmission. Once the intended receiving or destination node receives the training packet, the receiving node determines the minimum power level required for reliable communication between the transmitting node and the receiving node as noted in block 305. Specifically, the receiving node compares the signal strength of the training packet, as received at the receiving node, to the predetermined full power signal strength at which the training packet was sent in order to determine the loss or attenuation incurred in the transmission. Given this expected attenuation from the transmission node to the receiving node, the receiving node determines the minimum transmission power level required to ensure that a transmission from the transmitting node arrives at the receiving node with a sufficient signal to noise ratio for reliable communications. This process of determining the minimum power level required is further explained in relation to FIG. 4 below.

As shown in block 306, once the minimum or preferred power level is determined, the receiving node then sends back a configuration packet to the transmission node acknowledging that it received the training packet and including the proper transmission configuration information; that is, the preferred power level required to ensure reliable data transmission, as determined from the signal loss experienced during the training packet transmission. In block 307, the transmission node then reads this transmission configuration information and sends the data transmission to the receiving node at the preferred power level indicated. If the data transmission is received successfully, the receiving node sends an acknowledge signal ("ACK signal") to the transmission node, as noted in block 308. As indicated in block 309, if the ACK signal is not received by the transmission node, the data transmission was not received and the process returns to block 304 where the transmission node "re-trains" by re-sending a training packet and following the rest of the process. If the ACK signal is received by the transmission node, the communication was successful and the process is complete, ending at block 310. Once complete, other nodes may now use the transmission media of the network to perform other communications or transmissions using this same process.

Figure 4:
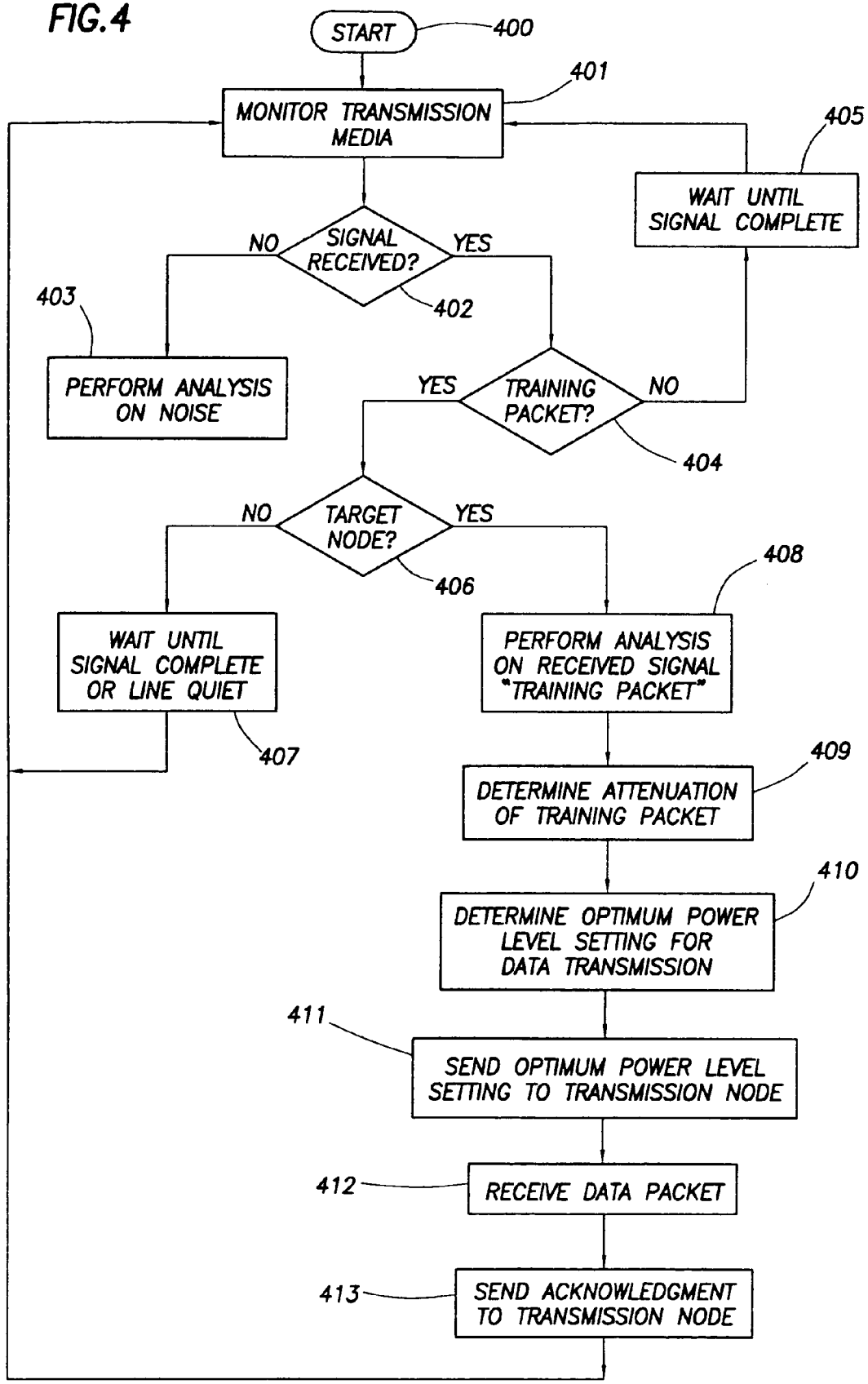
FIG. 4 shows a block diagram of an embodiment of the method or process used by the receiving node to determine the optimum power level for communications from a transmission node in accordance with the present invention.

FIG. 4 shows a block diagram of the method or process used by the receiving node to adaptively control the power of transmissions between two nodes in a network. More specifically, FIG. 4 shows a block diagram of the process used by the receiving node to determine the minimum power level required for reliable communication from the transmission node to the receiving node. The receiving node has control logic to perform this process, typically incorporated into the network card at the receiving node.

As shown in FIG. 4, the process starts at block 400. Via an interface to the transmission media, the receiving node monitors the transmission media in block 401. In block 402, the receiving node checks to see if a signal is being received. If no signal is present, the line is said to be quiet having only noise on the line. As indicated in block 403, the receiving node performs analysis on the noise. In particular, the receiving node measures the average power level or signal strength of the noise. This analysis is performed so that the receiving node knows what the current noise floor is on the transmission media. Since the noise may change over time due to changes in the environment, etc., this analysis is done whenever the line is quiet, i.e., whenever no signal is on the transmission media.

When a signal is received, the receiving node checks to see if it is a training packet in block 404. If it is not a training packet, the receiving node waits for the signal to be completed or for the line to return to quiet in block 405 and then returns to block 401 to continue monitoring the transmission media for the next signal received. If the signal is a training packet, the receiving node checks in block 406 to see if the packet is intended for the receiving node; that is, whether the receiving node is the target node for this packet. If the receiving node is not the target node, the receiving node waits for the signal to be completed or for the line to return to quiet in block 407 and then returns to block 401 to continue monitoring the transmission media for the next signal received. If the receiving node is the target node, the receiving node performs analysis on the received training packet in block 408. In particular, the receiving node measures the average power level or signal strength of the training packet as received at the receiving node. By comparing this power level to the power level at which the training packet was originally sent, the attenuation suffered by the training packet during the transmission can be determined in block 409. It is known that the training packet is originally sent at the predetermined maximum power level for the network. For example, if the maximum power level for the network is set to 20 dB and the training packet is received at 12 dB, the receiving node will determine that there has been 8 dB (20 dB−12 dB) of loss or attenuation suffered in the transmission between the transmission node and the receiving node.

In block 410, the receiving node then determines the optimum power level setting for transmission of data from the transmission node to the receiving node. Specifically, using the attenuation determined via the training packet in block 409, the current noise floor or level determined in block 403, and the known desired signal-to-noise ratio needed by the receiving node, the receiving node determines the minimum power level at which the transmission node can reliably transmit data to the receiving node. For example, where the noise floor is 1 dB, the attenuation is 8 dB, and the desired signal-to-noise ratio for reliable communications is 3 (or 3/1), the receiving node would determine the optimum (minimum) transmission power level required as follows: With 1 dB of noise, a 4 dB signal level is required at the receiving node to obtain a signal-to-noise ratio of 3. Since there is 8 dB of loss in the transmission media between the nodes, the transmission node must transmit at 12 dB for the receiving node to receive 4 dB. Thus, the minimum transmission power level would be 12 dB. Of course, some margin may be added to ensure reliable communications, i.e., the preferred power level may be set to 12+dB.

Once the optimum or preferred transmission power level has been determined in block 410, this power level setting is sent to the transmission node in a configuration packet as noted in block 411. Once the transmission node receives the configuration information, it sends the data packet at the preferred power level. The data packet is received by the receiving node in block 412. Once the receiving node has received the entire data packet, it sends an acknowledgement to the transmission node to indicate the success (or failure) of the transmission in block 413. The receiving node then returns to monitoring the transmission media and the process continues at block 401. If the data transmission is successful, the communication is complete. If the data transmission is not successful, the transmission node resends a training packet to the receiving node and the same process would be performed by the receiving node to again determine the preferred level to transmit the primary data communication.

Figure 5:
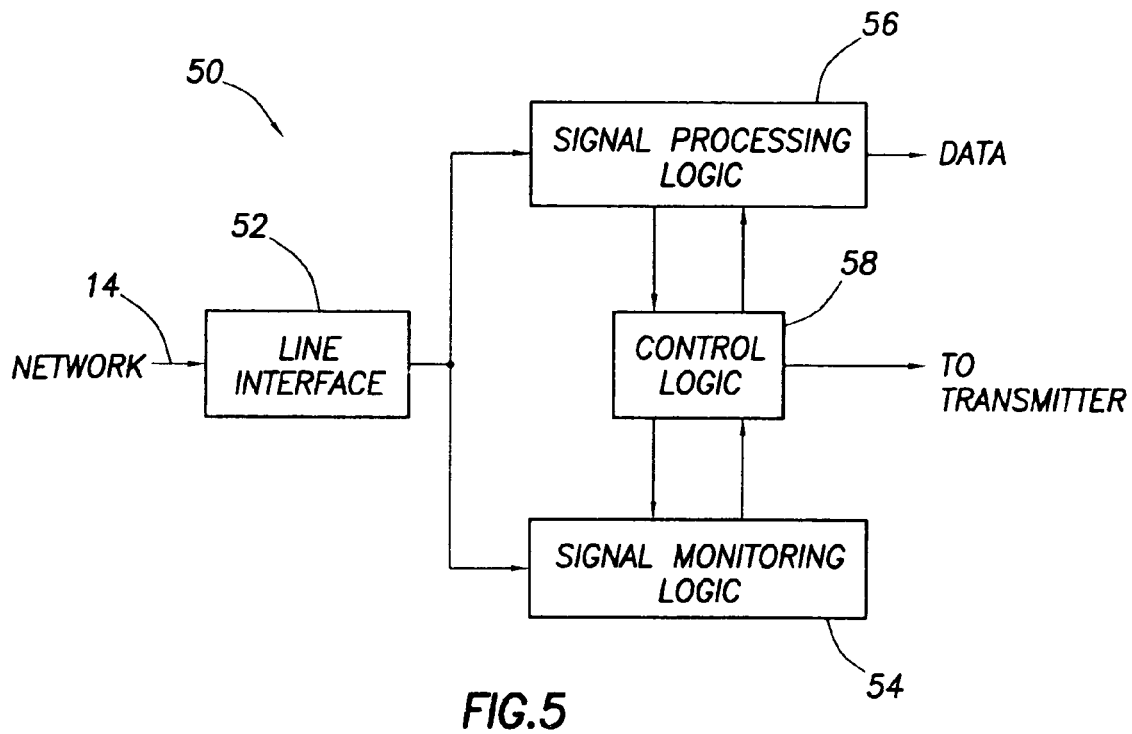
FIG. 5 shows a block diagram of an embodiment of a receiver operating in a receiving node in accordance with the present invention.

FIG. 5 shows a block diagram of an embodiment of a receiver operating in a receiving node of a network in accordance with the present invention. The receiver 50 is coupled to the common transmission media 14 of the network via a line interface 52. The line interface 52 is coupled to receiver signal monitoring logic 54 and receiver signal processing logic 56. Receiver control logic 58 is coupled to both the signal monitoring logic 54 and signal processing logic 56.

The signal monitoring logic 54 monitors the status of the transmission media 14 via line interface 52. When no signal is on the transmission media 14, i.e., the line is quiet, the signal monitoring logic 54 determines the average noise level or noise floor on the transmission media 14 as discussed above in reference to FIG. 4. This average noise level is communicated to control logic 58. When a training packet is received on the transmission media, the signal monitoring logic 54 determines if the packet is intended for this receiving node, i.e., is the receiving node the intended target node. If the receiving node is the target node, the signal monitoring logic 54 determines the average power level or signal strength of the training packet as received. This average power level of the training packet is communicated to control logic 58. By comparing this power level to the known full power level at which the training packet was originally sent, the control logic 58 determines the attenuation suffered by the training packet between the receiving node and the transmission node. Using these determined noise level and attenuation values, as well as the signal-to-noise ratio necessary for reliable communication with the receiving node, the control logic 58 determines the optimum or preferred power level necessary for the transmission node to reliably communicate with the receiving node, as discussed in relation to FIG. 4. The control logic 58 then sends this preferred transmission power level to the transmitter of the receiving node for transmission in a configuration packet to the transmission node. Upon receipt of the configuration packet, the transmission node can then send the primary data communication back to the receiving node at the preferred power level.

When the primary data transmission or packet is received at the receiving node, the signal processing logic 56 of the receiver extracts the data from the transmission using standard DSP (digital signal processing) techniques. The signal processing logic 56 may include standard signal processing to perform filtering, equalizing, compromising, demodulation, and decoding as necessary given the network protocol and environment. Control logic 58 may be used to control certain parameters or aspects of the receiver functions in relation to the determined noise level and attenuation. Once the data is extracted, the data is passed to the remainder of the receiving node, for instance the host PC for a receiver on an HPNA network card.

Figure 6:
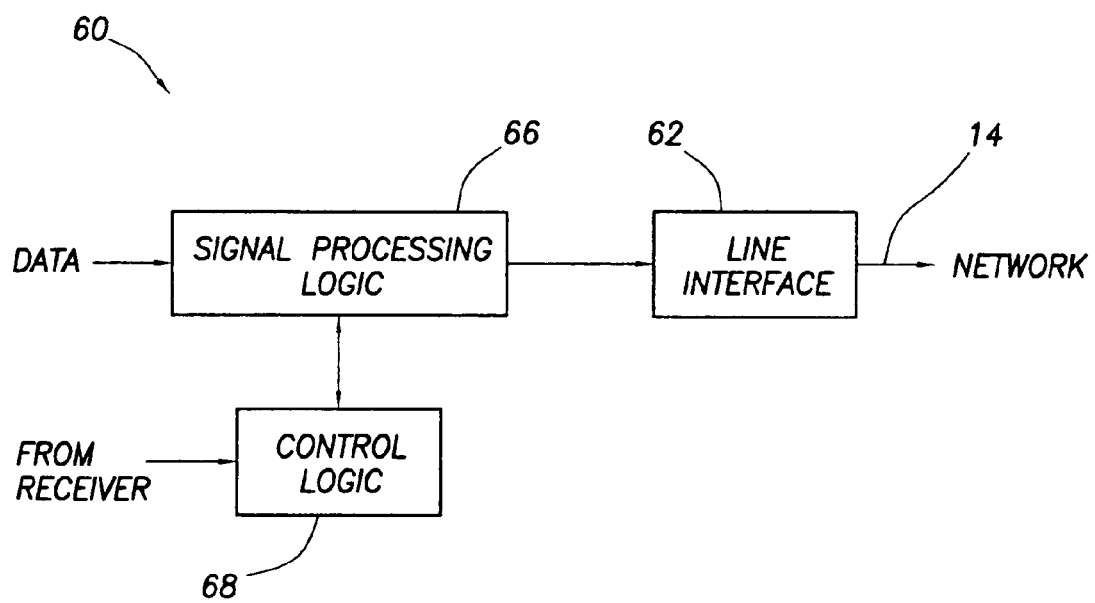
FIG. 6 shows a block diagram of an embodiment of a transmitter operating in a transmission node of a network in accordance with the present invention.

FIG. 6 shows a block diagram of an embodiment of a transmitter operating in a transmission node of a network in accordance with the present invention. The transmitter 60 is coupled to the common transmission media 14 of the network via a line interface 62. Transmitter signal processing logic 66 is coupled to line interface 62. Transmitter control logic 68 is coupled to the signal processing logic 66.

When a transmission is desired, data is sent to the transmitter 60 from the host PC or other system coupled to the transmitter 60. Before the transmission is sent, however, the transmitter 60 waits until there is no signal on the transmission media 14, i.e., the line is quiet. Signal monitoring logic in the receiver (not shown because not a part of the transmitter) monitors the transmission media 14. Once the line is quiet, the receiver notifies the transmitter control logic 68 that the transmission can begin. The control logic 68 then directs the transmitter signal processing logic 66 to send a training packet to the desired receiving node via the line interface 62. The target receiving node uses the training packet to determine the current preferred power level for communications between the transmission node and the receiving node and returns this information to the transmission node in a configuration packet. Once a configuration packet is received at the transmission node, the receiver passes the configuration information to the transmitter control logic 68. The control logic 68 uses the preferred power level information to adjust certain parameters and settings in the transmitter signal processing logic 66 so that the primary data transmission will be sent at the preferred power level. The signal processing logic 66 sends the primary data transmission at the preferred power level to the receiving node via the line interface 62 and transmission media 14. To complete the communication, the receiving node may return an acknowledgement signal to the transmission node to verify the success (or failure) of the communication. If a successful acknowledgement signal is received by the transmission node, the transmission is complete. If not, the transmission node would resend a training packet and repeat the process until a successful data transmission or communication has occurred.

It should be recognized that each node in a network includes a receiver and transmitter in order to communicate with other nodes in the network. Thus, a receiving node and a transmission node will have both a receiver and a transmitter. The receiver will operate as described and shown in FIG. 5 when the node is functioning as a receiving node. The transmitter will operate as described and shown in FIG. 6 when the node is functioning as a transmission node. Therefore, FIG. 5 and FIG. 6 together provide a description of how the complete receiver/transmitter system operates at each node in the network, whether the node is operating as a receiving node or a transmission node.

The above discussion is meant to be illustrative of the principles and various embodiments of the present invention. While the invention has been particularly shown and described with respect to specific embodiments thereof, numerous variations and modifications will become apparent to those skilled in the art once the above disclosure is fully appreciated. It is intended that the following claims be interpreted to embrace all such variations and modifications.

What is claimed is:

1. A method of adaptive power control in a computer network having a plurality of nodes coupled to a common transmission media, comprising:
   when no communications are present on the transmission media, sending a training packet from a transmission node of the network to a receiving node in the network at a predetermined power level known by the receiving node;
   receiving the training packet at a received power level;
   determining a preferred power level for reliable communications between the transmission node and the receiving node based on a comparison of the received power level to the predetermined power level;
   sending a configuration packet from said receiving node to said transmission node including the preferred power level for communication; and
   sending a primary data communication from the transmission node to the receiving node at the preferred power level.

2. The method of claim 1 further comprising performing collision detection at the transmission node and waiting until there are no communications on the transmission media of the network before sending the training packet.

3. The method of claim 1 further comprising determining an average noise level on the transmission media of the network.

4. The method of claim 1 wherein determining the preferred power level for reliable communications between the transmission node and the receiving node comprises:
   determining an average noise level on the transmission media of the network;
   determining a signal level necessary at the receiving node given the average noise level and required signal-to-noise ratio for reliable communication to the receiving node;
   determining an amount of attenuation suffered by the training packet between the transmission node and the receiving node; and
   determining a proper transmit level by summing the signal level necessary at the receiving node and the amount of attenuation.

5. The method of claim 4 wherein determining the signal level necessary at the receiving node given the average noise level and required signal-to-noise ratio for reliable communication to the receiving node comprises:
   adding the average noise level to the signal-to-noise ratio to determine the signal level necessary at the receiving node.

6. The method of claim 4 further comprising adding a margin for error to the proper transmit level.

7. The method of claim 4 wherein determining the amount of attenuation suffered by the training packet between the transmission node and the receiving node comprises:
   determining an average power level of the training packet as received at the receiving node; and
   comparing a power level of the training packet at the receiving node to the predetermined power level at which the training packet was sent to determine the amount of attenuation.

8. The method of claim 1 wherein the training packet is sent at full power as predetermined by the network protocol.

9. The method of claim 1 wherein the preferred power level for communications between the transmission node and the receiving node is a minimum power level for reliable communications.

10. A system for performing adaptive power control of communications between a transmission node and a receiving node in a network, comprising:
   a line interface coupled to the transmission media of the network;
   a receiver operating in the receiving node of the network, comprising:
      receiver signal monitoring logic coupled to said line interface to monitor the status of the transmission media of the network;
      receiver signal processing logic coupled to said line interface to receive and extract data from transmissions on the transmission media;
      receiver control logic coupled to said receiver signal monitoring logic and said receiver signal processing logic, wherein, based on a predetermined power level at which a training packet is transmitted to the receiving node, the receiver control logic determines a preferred power level for transmissions received from the transmission node in the network and transmits the preferred power level to the transmission mode; and
   wherein said receiver signal monitoring logic determines an average noise level on the transmission media when the line is quiet and communicates this level to the control logic.

11. The system of claim 10 wherein said receiver signal monitoring logic determines if a training packet sent by the transmission node is intended for the receiving node.

12. The system of claim 11 wherein said receiver signal monitoring logic determines an average power level of the training packet as received and communicates this level to the receiver control logic.

13. The system of claim 12 wherein said receiver control logic determines an attenuation between the receiving node and the transmission node by comparing a power level of the average power level of the training packet as received to the predetermined power level at which the training packet was originally sent.

14. The system of claim 10 wherein said receiver control logic determines an attenuation between the receiving node and the transmission node.

15. A system for performing adaptive power control of communications between a transmission node and a receiving node in a network, comprising:
   a line interface coupled to the transmission media of the network;
   a receiver operating in the receiving node of the network, comprising:
      receiver signal monitoring logic coupled to said line interface to monitor the status of the transmission media of the network;
      receiver signal processing logic coupled to said line interface to receive and extract data from transmissions on the transmission media;
      receiver control logic coupled to said receiver signal monitoring logic and said receiver signal processing logic, wherein, based on a predetermined power level at which a training packet is transmitted to the receiving node, the receiver control logic determines the preferred power level for transmissions received from the transmission node in the network and transmits a preferred power level to the transmission mode; and
   wherein said receiver control logic determines the preferred power level from noise level on the transmission media, attenuation between the receiving node and the transmission node, and required signal to noise ratio for reliable communication with the receiving node.

16. The system of claim 15 wherein said receiver control logic sends the preferred power level to a transmitter of the receiving node for transmission in a configuration packet to the transmission node.

17. The system of claim 15 wherein said receiver control logic controls said receiver signal processing logic to extract the data from a data transmission to the receiving node.

18. The system of claim 15 wherein the receiving node confirms success of communication between the transmission node and the receiving node by sending an acknowledgment to the transmission node.

19. A system for performing adaptive power control of communications between nodes in a network, comprising:
   a line interface coupled to a transmission media of the network;
   a transmitter operating in a transmission node of the network, comprising:
      transmitter signal processing logic coupled to said line interface to send transmissions to the transmission media;
      transmitter control logic coupled to said signal processing logic, where the transmitter control logic directs the transmitter signal processing logic to send a training packet to the receiving node at a predetermined power level to enable the receiving node to specify a preferred transmission power level based on the predetermined power level of the training packet, waits for a configuration packet containing the preferred power level from the receiving node, and then directs the transmitter signal processing logic to send a primary data transmission to the receiving node at the preferred power level; and
   wherein said training packet is only sent once the transmission media is quiet.

20. The system of claim 19 wherein said transmitter control logic uses the preferred power level to adjust certain parameters and settings in the transmitter signal processing logic so that the primary data transmission is sent at the preferred power level.

* * * * *